Nov. 2, 1948.  H. V. ATWELL  2,452,712
METHOD OF PRODUCING HYDROCARBON AND THE LIKE
Filed May 22, 1946
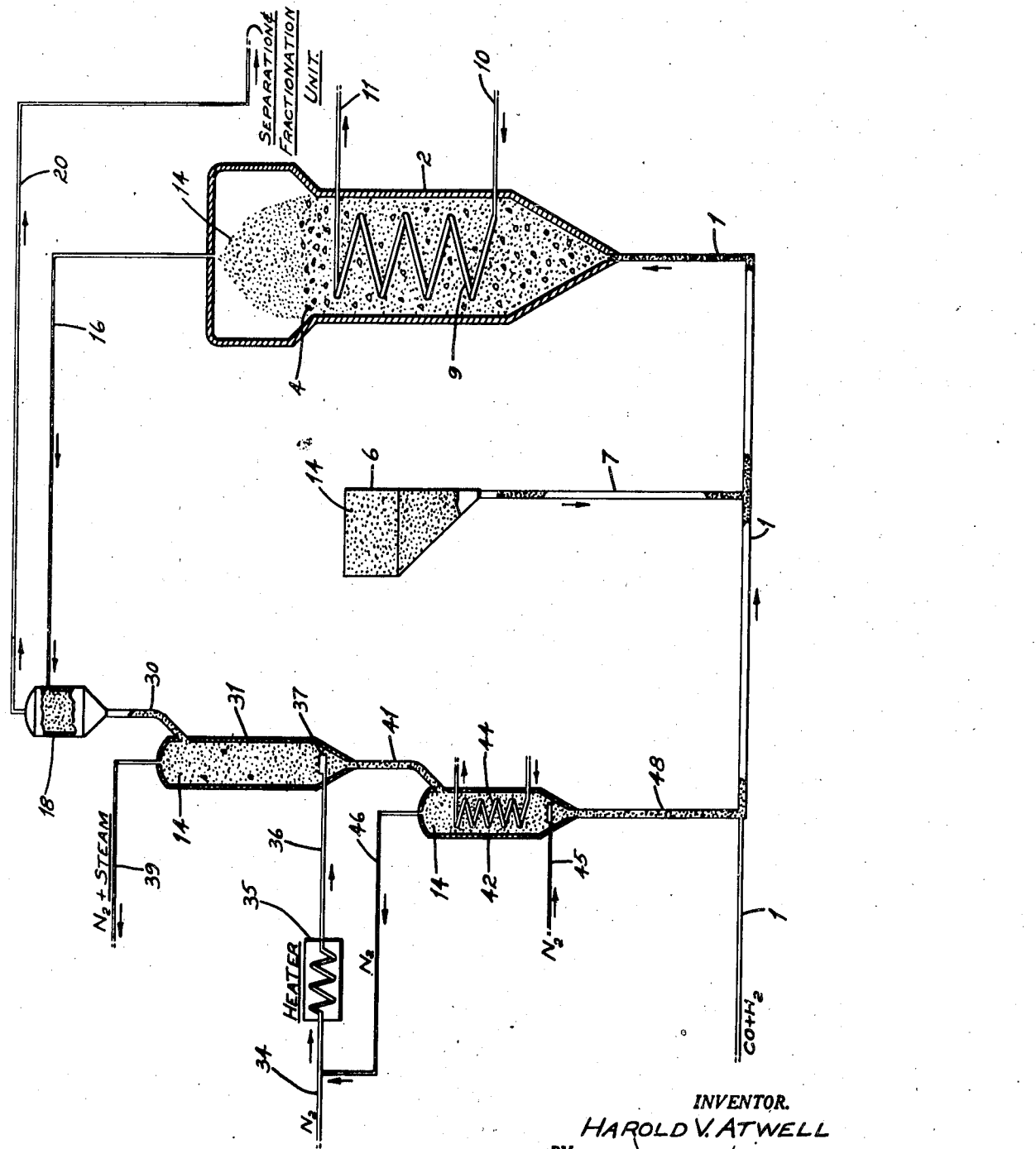
INVENTOR.
HAROLD V. ATWELL
BY 

Patented Nov. 2, 1948

2,452,712

UNITED STATES PATENT OFFICE 2,452,712

METHOD OF PRODUCING HYDROCARBON AND THE LIKE

Harold V. Atwell, Beacon, N. Y., assignor to The Texas Company, New York, N. Y., a corporation of Delaware Application May 22, 1946, Serial No. 671,571

10 Claims. (Cl. 260—449.6)

This invention relates to a method for catalytically converting carbon monoxide and hydrogen into hydrocarbons, oxygenated hydrocarbons and the like.

In accordance with this invention, carbon monoxide and hydrogen are converted into hydrocarbons, oxygenated hydrocarbons and the like by contact with a synthesis catalyst in the presence of a desiccant adapted to take up water produced in the synthesis reaction. In a continuous process for carrying out the synthesis reaction, provision is made for the continuous introduction of desiccant material to the reaction zone wherein it combines with water formed in the synthesis reaction, and the resulting water-bearing desiccant is continuously withdrawn from the reaction zone for regeneration and subsequent recycling.

Examples of effective desiccant materials comprise substances such as calcium oxide, barium oxide and magnesium oxide which chemically combine with water to form hydroxides, and substances such as calcium sulfate and the perchlorates of magnesium and barium which form hydrates. An essential characteristic of the desiccant material or dehydrating agent is that it must combine with water to form a compound or compounds stable at the temperature and pressure at which the synthesis reaction is conducted. The dissociation pressure of the compound formed by combination of the desiccant with water should be substantially less at the synthesis temperature and pressure conditions than the vapor pressure of water in the synthesis reaction zone.

Agents which remove water by chemical combination to form hydroxides and the like, are suitable for use in conversion reactions which are carried out at relatively high temperatures, for example, in the range of about 400–650° F., while agents which remove water as water of crystallization, or in other words, those which form hydrates, can be used for conversion reactions carried out at lower temperatures, for example, below about 400° F.

In general, the compounds that are formed by chemical interaction of water and desiccant are more stable since they require higher temperatures to convert them to their anhydrides.

The synthesis reaction is customarily effected with catalyst comprising a metal such as iron, cobalt or nickel, the reaction being carried out at temperatures ranging from about 250–750° F. and under pressures ranging from atmospheric to 1,000 pounds per square inch. Normally the synthesis reaction for the production of hydrocarbons and the like is accompanied by the formation of substantial amounts of water.

As the concentration of water in the reaction zone increases, there is increasing tendency for water to react with carbon monoxide to form carbon dioxide and hydrogen according to the water-gas shift reaction. When the synthesis is conducted at elevated temperatures, the reaction rates are such that substantial conversion of carbon monoxide to carbon dioxide by reaction with water takes place. The formation of carbon dioxide in the catalytic conversion deprives the system of carbon which could otherwise be converted to valuable hydrocarbons.

Therefore, by means of the present invention, carbon dioxide formation is minimized by removing water substantially as rapidly as it is formed in the synthesis reaction zone. By maintaining the water concentration in the reaction zone below about 10% by volume of the total constituents present therein, carbon dioxide formation is substantially eliminated. The decrease in carbon dioxide formation thus results in greater yields of hydrocarbons per molecule of carbon in the charge gases.

It is contemplated employing the synthesis catalyst in solid particle form. The solid catalyst particles may be disposed within the reaction zone in the form of stationary beds. On the other hand, the catalyst may be in the form of a mass of powder or finely-divided particles suspended in the gaseous reactants within the reaction zone. In a fixed bed type of operation, the catalyst may be in the form of relatively coarse particles, Raschig rings, or saddles, providing a substantial amount of free space through which a powdered desiccant is caused to flow, the powdered desiccant being suspended in reactant gases.

In the case of a suspended catalyst powder type of operation, both the catalyst powder and the desiccant powder may be suspended in reactant gases. Both the catalyst and the desiccant powders may be of substantially the same density so that there is concurrent flow of both powdered materials through the reaction zone. A "fluidized" mass of catalyst powder may be confined within the reaction zone through which the finely-divided desiccant material flows, the desiccant material having a settling rate substantially different from that of the catalyst powder. The desiccant may be relatively more dense than the suspended catalyst powder and thus be caused to drop through the fluidized catalyst mass. On the other hand, it may be relatively less dense, in which case it remains suspended in the gaseous reactants and rises through the fluidized catalyst mass.

In a fluidized fixed bed catalyst operation, the catalyst is maintained in a state which simulates a boiling condition without substantial entrainment of catalyst particles in the effluent stream leaving the reactor. The fluidization properties of the desiccant and of the compound it forms with water should be such that they either settle out in the bottom of the reactor or are entrained in the effluent gas stream. Provision can be made for continuous introduction of the desiccant in finely-divided form to the reaction zone, and for continuous withdrawal of desiccant containing water.

In the further description of the invention, reference will be made to a synthesis operation in which a fluidized bed of catalyst powder is confined within a synthesis reactor.

A stream of desiccant containing water chemically or physically associated therewith is continuously removed from the synthesis reaction zone and introduced into a regeneration zone wherein water is removed from the desiccant, after which the regenerated desiccant is recycled to the synthesis reaction zone. A convenient method of effecting this dehydration is to pass a gas stream in contact with the desiccant at a temperature at which the hydroxide or hydrate decomposes and desiccant is regenerated. An inert gas stream such as nitrogen is advantageously used for this purpose. The gas stream may be passed through a mass of the desiccant powder or particles so as to maintain it in a fluidized state, thereby reducing the period of time necessary for complete removal of water therefrom. For example, calcium hydroxide may be decomposed to calcium oxide by passage of nitrogen therethrough at a temperature of about 800° to 900° F. A desiccant, such as calcium sulfate, which removes H₂O as water of crystallization, may be regenerated from its hydrate by heating to a temperature of about 440° F.

An inert gas is advantageously used for the decomposition of a hydroxide or hydrate because the use of air or oxygen for this purpose would result in oxidation of any conversion catalyst that may be removed from the conversion zone along with the hydrated desiccant. Even though the quantity of catalyst which is present in the decomposition zone is small, its oxidation therein would necessitate a subsequent step in which the catalyst is reduced prior to its return into the conversion zone.

It will be necessary to cool the desiccant after its regeneration and prior to its return to the conversion zone. This cooling may be effected by passing the powdered material through a cooler in which a heat exchange medium passes in indirect heat exchange relationship with the powder. It is advantageous to supplement cooling conducted in this fashion by passing a stream of cold nitrogen countercurrently through the powder as it flows through the cooler. Treatment in this fashion not only effects cooling of the powder, but helps maintain it in a finely divided state.

The hot or partially cooled regenerated desiccant may also be used to preheat the feed gas.

Reference will now be made to a diagrammatic illustration of one method of practicing the invention in which a fluidized powder system is employed.

Carbon monoxide and hydrogen in a suitable molecular ratio are obtained from a source not shown through a pipe 1. Through the pipe 1, the mixture of carbon monoxide and hydrogen is introduced into a reactor 2 which is adapted to the employment of the catalyst in the form of a fluidized fixed bed.

In the reactor 2, the catalyst is maintained in a fluid state by the passage of the gases upwardly therethrough. The density and velocity of the reactant gases is correlated with the density and particle size of the catalyst maintained within the reactor so that the gases pass through the conversion zone without substantial entrainment of the catalyst particles in the effluent stream leaving the reactor.

An iron catalyst containing about 2 to 4 per cent alumina and about 0.2 to 2 per cent potassium oxide serves adequately as a catalyst for the hydrogenation of carbon monoxide. The particle diameters of the catalyst may lie in the range of about 5 to 450 microns; expressed in other terms, particle size may range from about 40 to 200 mesh. A particle size distribution should be employed so that fluidization of the catalyst is readily attained by passage of the reactant gases through the reactor 2. The numeral 4 designates the catalyst which is in the form of relatively coarse or dense particles. Other catalysts such as cobalt or nickel may also be employed to effect the catalytic conversion.

A storage hopper 6 provides a source of fresh desiccant in the form of relatively fine or less dense particles designated by the numeral 14. A standpipe 7 connects the storage hopper with the pipe 1 through which the fresh synthesis gas is flowing. As the stream of synthesis gas flows along the pipe 1, fresh desiccant, if needed, flows into the conduit 1 through the standpipe 7 from the storage hopper 6 and becomes entrained in the synthesis gas stream. Dehydrating agent is thereby introduced into the reactor 2 together with the stream of synthesis gas. This means of introducing desiccant is of importance during the initiation of the reaction prior to the establishment of a supply of regenerated dehydrating agent.

In the reactor 2, removal of the exothermic heat of reaction and maintenance of temperature within the prescribed limits is maintained through the use of a cooling member which is shown, symbolically, as a coil 9. A heat exchange medium, such as water or diphenyl oxide, enters the coil 9 through a pipe 10 and is discharged therefrom through a pipe 11. This heat exchange means may be adapted to the generation of steam which may be used as a source of power.

In the reactor 2, the synthesis gas is converted by contact with the catalyst maintained in the fluid state therein into liquid hydrocarbons in the gasoline range with the concomitant formation of water. Using an iron catalyst, the temperature is advantageously maintained within the range of 500° to 650° F. Pressures ranging from atmospheric to 1,500 pounds per square inch may be used, but a preferred pressure is about 250 pounds per square inch.

A desiccant must be employed which forms a compound with water whose dissociation pressure is substantially less at the temperature and pressure conditions of conversion than the partial pressure of water in the reactor. At these elevated temperatures, it is advisable to use a desiccant which reacts with water in chemical combination, such as calcium oxide, barium oxide or magnesium oxide. For purposes of description, we will use calcium oxide as the desiccant.

Substantially as fast as water is formed by the catalytic conversion of carbon monoxide and hydrogen, it combines with the desiccant which is passed through the reactor 2 suspended in the gas stream. Calcium oxide combines with water to form calcium hydroxide. The density and particle size of the formed calcium hydroxide are such that it is also carried along with the gas stream passing through the reactor 2. Unchanged desiccant and its hydroxide, namely, calcium hydroxide, pass on through the reactor 2 with the gas stream while the catalyst particles having different fluidization properties are entrained in the gas stream passing through the reactor only to a limited extent.

The products of conversion, together with entrained calcium oxide and calcium hydroxide, pass through the upper section of the reactor 2, which is advantageously of enlarged diameter to provide a settling space for catalyst particles. The products of the reaction, together with entrained calcium oxide and hydroxide and a portion of catalyst fines, leave the reactor 2 through a conduit 16. The conduit 16 leads to a vessel 18 which serves as a means of separating the product gases from entrained particles. A cyclone separator or a series of cyclone separators serve adequately to separate entrained particles which are mainly calcium hydroxide.

The product gases, from which solid matter has been separated, leave the vessel 18 through a pipe 20. The pipe 20 leads into a separation and fractionation unit, not shown, which serves as a means of dividing the products into component fractions. The unit comprises a number of conventional operations, such as fractionation, stabilization, etc., which are conventional and are not shown in the interest of simplicity.

The effluent from the reactor 2 is separated into a normally gaseous and a normally liquid fraction in the separation and fractionation unit. Advantageously the gaseous fraction is recycled at least in part to the reactor 2.

Water is separated from the condensed liquid fraction and the remaining hydrocarbon phase is then fractionated into various valuable cuts such as gasoline, gas oil, etc.

Returning to the solid particles which are separated from the products in the vessel 18, they flow through a conduit 30 leading from the bottom portion of the vessel 18 into a column 31. These solid particles comprise mainly calcium hydroxide, together with a small portion of unchanged desiccant, namely, calcium oxide and a small portion of finely divided catalyst.

In the column 31, the solid particles flow countercurrently to a rising stream of gas which is at an elevated temperature in the range of about 800° to 900° F. This temperature is the approximate temperature required for the decomposition of calcium hydroxide to calcium oxide. An inert gas stream, such as nitrogen, serves adequately for this purpose. If the synthesis gas is prepared by the oxidation of a hydrocarbon gas, such as methane, with a limited quantity of molecular oxygen, an adequate supply of nitrogen will be available from the manufacture of oxygen.

The nitrogen to be used for this purpose is obtained from a source not shown through a pipe 34 which leads into a heater 35 in which the nitrogen stream is raised to a suitable temperature such as 800° to 825° F. and is then introduced into the column 31 through a pipe 36 which connects with a distributor 37. As the particles fall through the column 31 against the rising stream of hot nitrogen, calcium hydroxide loses water to reform calcium oxide. Nitrogen, together with steam which has been formed by the removal of water from the calcium hydroxide, leaves the column 31 through a pipe 39.

Instead of nitrogen, other gases may be used to effect the dehydration of the compound formed by union with water of the desiccant used in the reaction. For example, the gaseous hydrocarbon fraction which is separated from the remainder of the products in the separation and fractionation unit 82 may be heated to an elevated temperature and used to effect this dehydration. In this instance, the gas stream leaving the column 31 through the pipe 39 would be introduced into the separation and fractionation unit which is not shown.

Air may be used to effect decomposition of the hydroxide, but it will be necessary to subsequently treat the desiccant with hydrogen in order to reduce oxidized entrained catalyst to the metallic state.

Solid particles which are now all in the form of dehydrating agent, together with a small portion of catalyst fines, leave the column 31 through a conduit 41 which leads into a vessel 42 in which the particles are cooled. Upon leaving the column 31, the particles are at an elevated temperature of about 800° to 850° F. and must be cooled to a reduced temperature before they are reintroduced into the reactor 2. The vessel 42 serves as means of effecting this temperature reduction. An indirect means of heat exchange may be used to partially cool the catalyst. A cooling coil 44 through which a heat exchange medium such as water or diphenyl oxide passes serves as means of indirect heat exchange. Cold nitrogen, obtained from a source not shown, is introduced into the vessel 42 through a pipe 45 and cools the particles by direct heat exchange as they fall countercurrent to the stream of cold nitrogen. Nitrogen, after cooling the particles of dehydrating agent, leaves the vessel 42 through a pipe 46 and thereafter may be introduced into the pipe 34 which serves as the feed line for the nitrogen which is used to effect dehydration of calcium hydroxide in the column 31.

In the vessel 42, the particles of dehydrating agent are cooled to a temperature of about 250° to 300° F. From the vessel 42, the particles of dehydrating agent flow through a standpipe 48 into the conduit 1 which serves as a means of introducing synthesis gas to the reactor 2. The particles of desiccant become entrained in the gaseous stream in the conduit 1 and are returned therewith to the bottom portion of the reactor 2 where they combine with additional quantities of water substantially as such is formed in the catalytic conversion of carbon monoxide and hydrogen.

As pointed out previously, the heat content of the desiccant may be utilized to preheat the reactor feed. The return of cooled particles to the bottom portion of the reactor 2 in this manner helps alleviate the problem of temperature control which is acute in the bottom portion of the reactor since a substantial portion of the conversion takes place in this area of the reactor.

The method of the invention has been described as adapted to a catalytic conversion in which a fluid bed type of operation is employed. At this point, reference will briefly be made to how the method of the invention may be readily adapted to the various other types of catalytic conversion of gaseous reactants, namely, fixed bed, suspensoid and Thermofor systems.

In a fixed bed type of operation, the desiccant in finely divided particle form may be entrained in the stream of reactants entering the conversion zone. The desiccant is judiciously selected so that the properties of the compound formed by reaction of desiccant with water are such that it also becomes entrained in the gaseous stream passing through the reactor. Separation of unreacted desiccant and its hydroxide or hydrate from the effluent stream may be effected in the separate zone after which desiccant may be regenerated by dehydrating its hydrate or hydroxide. The entering stream of reactants may serve as the vehicle by which regenerated desiccant is again introduced into the reaction zone.

In a suspensoid type of conversion which is defined as one in which the gaseous reactants carry the catalyst through the conversion zone as a suspension of finely divided particles, a desiccant is chosen whose density and particle size are such that the desiccant flows through the reaction zone counter-currently to the stream of reactants and suspended catalyst.

In a moving bed operation, the catalyst particles flow downwardly through a reaction zone counter-currently to the stream of reactants under the impulse of the forces of gravity. In adapting the method of this invention to such type operation, the desiccant might be passed through the reaction zone entrained in the stream of reactants and counter-currently to the catalyst particles. The desiccant might also pass through the reaction zone concurrently with the catalyst particles and be regenerated after separation from the catalyst in a zone external to the reactor.

As has been mentioned previously, the use of various types of desiccants are included within the concept of the invention. Thus, desiccants which add water as water of crystallization to form hydrates such as calcium sulfate, magnesium perchlorate and potassium perchlorate are all included within the concept of the invention.

Obviously many modifications and variations of the invention, as hereinbefore set forth, may be made without departing from the spirit and scope thereof and, therefore, only such limitations should be imposed as are indicated in the appended claims.

I claim:

1. In the production of hydrocarbons, oxygenated hydrocarbons and the like by the catalytic reduction of carbon monoxide with hydrogen in the presence of a solid synthesis catalyst capable of effecting such conversion with the accompanying formation of water, the improvement which comprises passing said reactants in contact with said catalyst in a reaction zone under an elevated temperature and pressure effective for conversion of the reactants into desired products of reaction, maintaining said contact for a period of time sufficient to effect a substantial degree of conversion, continuously introducing into said reaction zone a desiccant material which chemically combines with the water produced in the reaction zone to form a compound, the dissociation pressure of which is substantially less at the temperature and pressure conditions of conversion than the partial pressure of water in said conversion zone, passing said desiccant material through the reaction zone, removing the desiccant from the reaction zone after combination with water vapor and maintaining the introduction and removal of the desiccant at a rate at which a substantial portion of the water formed in the reaction zone is removed thereby.

2. In the conversion of carbon monoxide and hydrogen into higher molecular weight hydrocarbons, oxygenated hydrocarbons and the like in the presence of a synthesis catalyst capable of effecting such conversion with the accompanying formation of water, the method that comprises passing carbon monoxide and hydrogen in contact with such synthesis catalyst maintained in a conversion zone under conditions effective for said conversion, effecting substantial conversion during said contact, continuously passing through said conversion zone a solid desiccant effective to form with water produced in the reaction a compound whose dissociation pressure is substantially less at the temperature and pressure conditions of conversion than the vapor pressure of water in said conversion zone, continuously removing said compound from said conversion zone, subjecting said compound in a separate zone to dehydration to an extent sufficient to reconvert said compound to a solid desiccant effective to combine with water in said reaction zone, and continuously returning said dehydrated desiccant to said conversion zone.

3. In the conversion of carbon monoxide and hydrogen into higher molecular weight hydrocarbons, oxygenated hydrocarbons and the like in the presence of a synthesis catalyst capable of effecting such conversion with the accompanying formation of water, the method that comprises passing carbon monoxide and hydrogen in contact with such synthesis catalyst maintained in a conversion zone under conditions effective for said conversion, effecting substantial conversion during said contact, continuously passing through said conversion zone a solid desiccant effective to form with water produced in the reaction a compound whose dissociation pressure is substantially less at the temperature and pressure conditions of conversion than the vapor pressure of water in said conversion zone, continuously removing said compound from said conversion zone, subjecting said compound in a separate zone at substantially constant pressure at a temperature higher than the temperature prevailing in said conversion zone to dehydration to an extent sufficient to reconvert said compound to a solid desiccant effective to combine with water in said reaction zone, cooling said desiccant and continuously returning said desiccant to said conversion zone.

4. In the conversion of carbon monoxide and hydrogen into higher molecular weight hydrocarbons, oxygenated hydrocarbons and the like in the presence of a synthesis catalyst capable of effecting such conversion with the accompanying formation of water, the method that comprises passing carbon monoxide and hydrogen in contact with such synthesis catalyst maintained in a conversion zone under conditions effective for said conversion, effecting substantial conversion during said contact, continuously passing through said conversion zone a solid desiccant effective to form with water produced in the reaction a compound whose dissociation pressure is substantially less at the temperature and pressure conditions of conversion than the vapor pressure of water in said conversion zone, continuously removing said compound from said conversion zone, treating said compound at substantially constant pressure with nitrogen at a temperature higher than that prevailing in said conversion zone thereby decomposing said compound and regenerating said desiccant and continuously returning said desiccant to said conversion zone.

5. In the conversion of carbon monoxide and hydrogen into higher molecular weight hydrocarbons, oxygenated hydrocarbons and the like in the presence of a synthesis catalyst capable of effecting such conversion with the accompanying formation of water, the method that comprises passing carbon monoxide and hydrogen in contact with such synthesis catalyst maintained in a conversion zone under conditions effective for said conversion, effecting substantial conversion during said contact, continuously passing through said conversion zone a solid desiccant effective to form with water produced in the reaction a compound whose dissociation pressure is substantially less at the temperature and pressure conditions of conversion than the vapor pressure of water in said conversion zone, continuously removing said compound from said conversion zone entrained in an effluent therefrom, separating gaseous components of effluent from said compound, treating said compound at substantially constant pressure with nitrogen at a temperature higher than that prevailing in said conversion zone, thereby decomposing said compound, regenerating said desiccant and continuously returning said desiccant to said conversion zone.

6. The method according to claim 5 in which the desiccant is calcium oxide.

7. In the conversion of carbon monoxide and hydrogen into higher molecular weight hydrocarbons, oxygenated hydrocarbons and the like in the presence of a synthesis catalyst capable of effecting such conversion with the accompanying formation of water, the method that comprises passing carbon monoxide and hydrogen in contact with such synthesis catalyst maintained in a conversion zone under conditions effective for said conversion, effecting substantial conversion during said contact, continuously passing through said conversion zone a solid desiccant effective to form with water produced in the reaction a compound whose dissociation pressure is substantially less at the temperature and pressure conditions of conversion than the vapor pressure of water in said conversion zone, continuously removing said compound from said conversion zone entrained in a gaseous effluent therefrom, separating gaseous components of effluent from said compound, treating said compound at substantially constant pressure with nitrogen at a temperature higher than that prevailing in said conversion zone, thereby decomposing said compound and regenerating said desiccant, effecting entrainment of said regenerated desiccant in carbon monoxide and hydrogen and continuously returning said desiccant to said conversion zone together with said carbon monoxide and hydrogen.

8. In the production of hydrocarbons, oxygenated hydrocarbons and the like by the catalytic reduction of carbon oxide with hydrogen in the presence of a synthesis catalyst capable of effecting such conversion with the accompanying formation of water, the improvement which comprises passing said reactants in contact with said catalyst in a conversion zone under conditions effective for said conversion, while continuously introducing into said conversion zone a solid desiccant material effective to combine with water vapor produced in the reaction under said conversion conditions to form a solid compound, continuously withdrawing from the reaction zone said solid compound, subjecting said withdrawn solid compound to dehydration such that it is reconverted into a desiccant effective to combine with water vapor in the reaction zone and continuously recycling dehydrated desiccant to said reaction zone.

9. In the production of hydrocarbons, oxygenated hydrocarbons and the like by the catalytic reduction of carbon monoxide with hydrogen in the presence of a solid synthesis catalyst capable of effecting such conversion with the accompanying formation of water, the improvement which comprises passing said reactants in contact with said catalyst in a reaction zone under an elevated temperature and pressure effective for conversion of the reactants into desired products of reaction, maintaining said contact for a period of time sufficient to effect a substantial degree of conversion, continuously introducing into said reaction zone a solid desiccant material which chemically combines with water vapor to form a solid product stable at the temperature and pressure prevailing in the reaction zone, passing said solid desiccant material through the reaction zone, removing the solid product from the reaction zone after combination with water vapor and continuing the introduction and removal of said solid desiccant material at such a rate that a substantial portion of the water formed in the reaction zone is removed thereby.

10. The method according to claim 9, wherein said catalyst is in the form of a powder maintained in fluid phase condition in the reaction zone.

HAROLD V. ATWELL.

REFERENCES CITED

The following references are of record in the file of this patent:

UNITED STATES PATENTS

| Number | Name | Date |
|---|---|---|
| 1,741,306 | Jaeger | Dec. 31, 1929 |
| 2,257,293 | Dreyfus | Sept. 30, 1941 |
| 2,369,106 | Heckel | Feb. 6, 1945 |
| 2,393,909 | Johnson | Jan. 29, 1946 |
| 2,406,864 | Thomas | Sept. 3, 1946 |

FOREIGN PATENTS

| Number | Country | Date |
|---|---|---|
| 278,353 | Great Britain | Mar. 25, 1929 |
| 503,622 | Great Britain | Apr. 12, 1939 |